Patented June 17, 1930

1,764,031

UNITED STATES PATENT OFFICE

ROBERT AMES NORTON, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF CRUDE ANTHRACENE

No Drawing.   Application filed August 17, 1928. Serial No. 300,397.

This invention relates to the purification of crude anthracene which normally contains impurities such as carbazole, phenanthrene, dead oils and other bodies which present a serious problem for purification.

In the past, solvents have been used which dissolve phenanthrene or in some cases both phenanthrene and carbazole and which do not dissolve anthracene at low temperatures. According to the present invention anthracene is purified by a new solvent consisting of tetrahydrofurfuryl alcohol or its homologues or analogues. Tetrahydrofurfuryl alcohol has a most remarkably low solvent power for anthracene at low temperatures. It has a remarkably high solvent power for phenanthrene, for hydrocarbons or other oily materials and also has a better solvent power for carbazole than the other phenanthrene solvents which have been used in the past, such as aromatic hydrocarbons of the benzol series, acetone, gasoline, alcohol, chlorinated compounds, such as orthodichlorbenzene, and the like. It is possible by using tetrahydrofurfuryl alcohol as a solvent to prepare from crude anthracene of various grades of purity a purified anthracene which is sufficiently high grade to be transformed directly by a single catalytic oxidation into high grade anthraquinone. The losses of anthracene are extremely small, which makes the process one of great efficiency. It is a further advantage of tetrahydrofurfuryl alcohol that the solvent is available in large quantities at a moderate price, does not evolve toxic vapors such as benzol and possesses a very pleasant odor in marked contrast to pyridine which, despite its efficiency as an anthracene purification solvent has serious disadvantages in its vile odor.

Tetrahydrofurfuryl alcohol can be used in recrystallization, leaching or washing processes and may be combined with other known solvents, for example, with cheaper solvents that are capable only of removing phenanthrene. It is also feasible where very high grade anthraquinone is desired to use a two-step process in which a treatment with tetrahydrofurfuryl alcohol is combined with the catalytic purification of anthracene. Thus, for example, crude anthracene may be subjected to a treatment with tetrahydrofurfuryl and then to a catalytic purification which burns out carbazole and small amounts of phenanthrene, leaving an anthracene of high purity. Of course, the process may be carried out in the reverse order, that is to say the catalytic purification of anthracene followed by a treatment with tetrahydrofurfuryl alcohol. This latter method reduces the amount of solvent required as the quantity of impurities is greatly decreased. In general, the solvent treatment with tetrahydrofurfuryl alcohol or its homologues would be applicable to impure anthracene of any grade. It is also desirable in some cases to combine the treatment with a caustic fusion in order to remove the carbazole. Such a combined process is of economic interest where a market for the recovered carbazole is readily available.

It is an advantage of the present invention that it is possible to precipitate phenanthrene and carbazole from the mother liquors of the treatment in a relatively high grade form, which permits their utilization for various purposes requiring high grade phenanthrene or carbazole.

The invention will be described in greater detail in connection with the following specific examples which illustrate the application of the invention to typical crude anthracenes.

*Example 1*

25 kg. of crude anthracene containing 33½% anthracene, 18.9% carbazole and the remainder mainly phenanthrene are treated with 100 liters of hot tetrahydrofurfuryl alcohol and the mixture is then cooled 10° C. and filtered. The precipitate is a greenish yellow crystalline cake which is washed first with 15 and then with 10 liters of tetrahydrofurfuryl alcohol, the cake being pressed out after each washing. The last of the alcohol is then displaced from the cake by a 15 and then a 10 liter portion of benzene, the cake again being pressed after each washing. The dried cake weighs 10.2 kg. and on analysis shows 79.95% anthracene, 10.85% carbazole and the remainder mainly phenanthrene. This corresponds to a recovery of 97% of the anthracene content of the crude material. The mother liquor may be suitably treated to precipitate out carbazole and phenanthrene which may be then utilized in any suitable manner or may be further purified. The anthracene obtained can be directly oxidized to high grade anthraquinone by catalytic vapor phase oxidation. The process is very efficient as the losses of tetrahydrofurfuryl alcohol are very low.

*Example 2*

Crude anthracene containing from 28-35% anthracene is subjected to the catalytic vapor phase purification as described in the application of A. O. Jaeger, Serial No. 228,977, filed October 26, 1927. In this application crude anthracene is purified by subjecting it in admixture with an oxidizing agent to the vapor phase catalytic oxidation of impurities in the presence of a stabilized catalyst, which favors oxidation of the majority of the carbazole and some of the phenanthrene but which is a relatively weak catalyst for the oxidation of anthracene. The resulting semi-purified anthracene contains little or no carbazole but contains from 10-20% of phenanthrene and in some cases even more. This semi-purified anthracene is then treated with tetrahydrofurfuryl alcohol as described in Example 1 and results in an anthracene of extraordinarily high purity containing little or no phenanthrene and carbazole. An excellent percentage yield is obtained. Instead of using a recrystallization as described in Example 1, the semi-purified anthracene may be washed or leached with tetrahydrofurfuryl alcohol and a similar process can be used in Example 1, resulting in a product having about the same characteristics. Instead of tetrahydrofurfuryl alcohol, of course, its homologues may be used with equal success and mixtures of various homologous tetrahydrofurfuryl alcohols may be used.

The invention is described more particularly in connection with tetrahydrofurfuryl alcohol but it should be understood that other hydrogenated furfuryl alcohols may be used with similar results.

What is claimed as new is:

1. A method of purifying impure anthracene, which comprises subjecting it to the solvent action of a hydrogenated furfuryl alcohol.

2. A method of purifying impure anthracene, which comprises subjecting it to the solvent action of tetrahydrofurfuryl alcohol.

3. A method of purifying a crude anthracene, which comprises subjecting it to the solvent action of a hydrogenated furfuryl alcohol.

4. A method of purifying an impure anthracene, which comprises dissolving it in a hot tetrahydrofurfuryl alcohol, cooling and separating the mother liquor from the precipitate formed.

5. A method according to claim 4, in which the solvent remaining in the precipitate is displaced by a phenanthrene solvent.

6. A process according to claim 4, in which the solvent in the cake is displaced by a hydrocarbon of the benzene series.

Signed at Pittsburgh, Pennsylvania, this 15th day of August, 1928.

ROBERT AMES NORTON.